United States Patent [19]

Jacobs et al.

[11] Patent Number: 5,243,520
[45] Date of Patent: Sep. 7, 1993

[54] SENSE DISCRIMINATION SYSTEM AND METHOD

[75] Inventors: Paul S. Jacobs, Clifton Park; George R. Krupka, Schenectady, both of N.Y.

[73] Assignee: General Electric Company, Schenectady, N.Y.

[21] Appl. No.: 15,042

[22] Filed: Feb. 8, 1993

Related U.S. Application Data

[63] Continuation of Ser. No. 570,584, Aug. 21, 1990, abandoned.

[51] Int. Cl.⁵ .............................................. G06F 15/38
[52] U.S. Cl. .................................................. 364/419.08
[58] Field of Search ........................................ 364/419

[56] References Cited

U.S. PATENT DOCUMENTS

| | | | |
|---|---|---|---|
| 4,661,924 | 4/1987 | Okamoto et al. | 364/419 |
| 4,868,750 | 9/1989 | Kucera | 364/419 |
| 5,056,021 | 10/1991 | Ausborn | 364/419 |
| 5,060,155 | 10/1991 | van Zuijlen | 364/419 |
| 5,068,789 | 11/1991 | van Vliembergen | 364/419 |
| 5,099,425 | 3/1992 | Yuji et al. | 364/419 |

OTHER PUBLICATIONS

Jacobs, Making Sense of Lexical Acquisition, International Workshop on Lexical Acquisition, Detroit, Aug. 21, 1989.

Jacobs, Semantic Interpretation and the Lexicon: What Makes Sense? Viewgraphs used in talks at Belt Beranek Newman, Dec. 1989 and at IBM J. J. Watson Research Center, Mar. 1990.

Jacobs et al., Generic Text Processing: A Progress Report, Proceedings of the 3rd DARPA Speech and Natural Language Workshop, Somerset, Pa., Jun. 24-27, 1990.

*Primary Examiner*—Robert A. Weinhardt
*Attorney, Agent, or Firm*—Paul R. Webb, II

[57] ABSTRACT

A sense discrimination system and method are described. One aspect of the present invention includes a method for performing sense discrimination, a token stream including a token wherein each sense of each lexical entry may be marked with a positive or negative morphology preference, each sense of each entry may be marked with relevant contexts, and each sense of each entry may be marked with a positive/negative status being provided, at least a portion of one parse tree and at least a portion of one head tail matrix also being provided. The method includes the steps of converting each preference marking into a raw numeric score, scoring the sense preference information, determining a best sense of a lexical entry from the sense preference information score, and inserting a designation for the best sense into a respective token.

3 Claims, 3 Drawing Sheets

FIG. 2

SENSE DISCRIMINATION SYSTEM AND METHOD

This application is a continuation of application Ser. No. 07/570,584, filed Aug. 21, 1990 now abandoned.

A portion of this disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates generally to natural language processing, and more particularly, relates to a system and method for recording text.

RELATED APPLICATIONS

The present application is related to commonly assigned and copending U.S. patent application Ser. Nos. 07/570,583 and 07/570,585 entitled, respectively, Morphological Analysis System And Method and A Method For Generating A Lexicon.

BACKGROUND OF THE INVENTION

Automated natural language (NL) text processing typically refers to text processing, such as text retrieval performed on text by a computer capable of "reading" and "understanding" the semantics of the text. Efficient natural language processing systems can be of great benefit in performing tasks such as information retrieval. The computer, by being able to understand the meaning, i.e., semantics, of the text, can perform a more accurate search and bring only relevant information to the attention of the requestor.

In order to perform such "intelligent" searches, the computer itself must "understand" the text. Natural language processing systems therefore typically contain tools, or software modules, to facilitate generating a representation of an understanding of the text. Particularly, when text is input to a NL system, the system not only stores the text but also generates a representation, in a computer-understandable format, of the meaning, i.e., semantics, of the text.

For generating a computer-understandable semantic representation of text, natural language processing systems include, in general and at a high level, a lexicon module and a processing module. The lexicon module is a "dictionary", or database, containing words and semantic knowledge related to each word. The processing module typically includes a plurality of analyzer modules which operate upon the input text and the lexicon module in order to process the text and generate the computer-understandable semantic representation. Particularly, the processing module generates a recorded version for each word of text, and the recoded version includes fields which represent semantic knowledge. Once this semantic knowledge of the text is generated in a computer-understandable format, a system user can use the computer, via an application program such as a search program to perform tasks such as text retrieval.

Most problems in natural language processing, e.g., information retrieval, database generation, and machine translation, hinge on relating words to other words that are similar in meaning. Because of the extreme difficulty of producing any accurate deep-level analysis of text, many of these strategies are inherently word-based. In the case of information retrieval, current methods match words in a query with words in documents, with the degree of match weighted according to the frequency of words in texts. In database generation, programs map individual words into names of frames or database records. In language translation, systems use mappings between words in "source" language and words in a "target" language to guide lexical choice (word choice). In all these applications, current methods are limited in their accuracy by the fact that many words have multiple senses, although different words often have similar meanings.

This problem is generally referred to as lexical inadequacy. Problems related to lexical inadequacy include the issue of genuinely ambiguous words as well as vague terms and derivative words, i.e., words that have a common root but vary slightly in meaning. Previous approaches to the problem of lexical inadequacy fall into two basic categories-word-based approaches and deep-level approaches. Word-based approaches have addressed the problem in several ways, including using co-occurrence and other contextual information as an indicator of text content to try to filter out inaccuracies, using word roots rather than words by stripping affixes, and using a thesaurus or synonym list that matches words to other words. Deep-level approaches can be more accurate than word-based approaches, but have not been sufficiently robust to perform any practical text processing task. This lack of robustness is generally due to the difficulty in building knowledge bases that are sufficient for broad-scale processing.

SUMMARY OF THE INVENTION

The present sense discrimination system and method may be utilized to determine a best sense for each lexical entry corresponding to a text element of input text. Briefly, each lexicon entry in a lexicon may include a plurality of senses, i.e., a word may have multiple meanings. The present invention may be utilized to determine which meaning is the best meaning for a each particular text element. A token stream, a parse tree or forest, and a head-tail matrix or matrices are provided to the sense discrimination system as input. Using this input, the present invention determines a raw numeric score for each sense, scores preference information, and then determines a maximum head sense score. The sense having the maximum head sense score is then designated as the best sense, and this best sense may then be indicated in the token.

The present invention facilitates a deep-level analysis of text by providing an indication as to which sense of each word of text is preferred. The present invention directly addresses the problem encountered in prior systems by explicitly recognizing the fact that many words have multiple senses, although different words often have similar meanings. Utilizing the above scoring method, and rather than ignoring the possibility that a word may have many senses, the present invention determines a preferred sense.

The present invention also overcomes problems related to lexical inadequacy. Particularly, the present invention not only facilitates generating a deep-level understanding of text which, in turn, facilitates more accurate subsequent natural language processing, the present invention is sufficiently robust to perform any practical text processing task. This robustness is provided, for example, by facilitating use of a broad-scale lexicon which may include a plurality of senses for each lexical entry, an indication as to a context preference for each sense, and indication of primary and secondary sense preferences for each lexical entry.

BRIEF DESCRIPTION OF THE DRAWINGS

These and other objects of the present invention, together with further features and advantages thereof, will become apparent from the following detailed specification when read together with the accompanying drawings, in which.

DETAILED DESCRIPTION OF THE DRAWINGS

The present invention is specifically directed to a sense discrimination system and method. The present invention is not directed to a preprocessor, parser, or a semantic interpreter. Outputs from such automated components, however, may be provided as inputs to the present system.

To facilitate an understanding of the present invention, the following detailed discussion includes a detailed description of a lexicon, input to the present sense discrimination system, and output from the sense discrimination system. The sense discrimination system and method are then described.

I. A Lexicon

The following discussion describes one particular lexicon and this discussion is provided for illustrative purposes only. It should be understood that the present invention could be utilized with many other lexicons and is not limited to practice with any one lexicon.

A lexicon which may be utilized with the present system and method includes a hierarchy of parent concepts for encoding semantic preferences and restrictions, sense-based morphology and subcategorization, a distinction between primary and secondary senses and senses that require particular "triggers" or appear only in specific contexts, and a broad range of collocational information. For example, the following listing is a lexical entry for the word "issue":

```
(issue
   :POS noun
   :SENSES
   ((issue1
      :EXAMPLE (address important issues)
      :TYPE p
      :PAR (c-concern)
      :ASSOC (subject) )
   (issue2
      :EXAMPLE (is that the october issue?)
      :TYPEs
      :PAR (c-published-document)
      :ASSOC (edition) )))
(issue
   :POS verb
   :G-DERIV nil
   :SENSES
   (( issue1
      :SYNTAX (one-obj io-rec)
      :EXAMPLE (the stockroom issues supplies)
      :TYPEp
      :PAR (c-giving)
      :ASSOC (supply)
```

-continued

```
      :S-DERIV  ((-able adj tr__ability)
                 (-ance noun tr__act)
                 (-er noun tr__actor)) )
   (issue2
      :SYNTAX (one-obj io-rec)
      :EXAMPLE (I issued instructions)
      :TYPEp
      :PAR (c-informing)
      :ASSOC (produce)
      :S-DERIV ((-ance noun tr__act)) )
   (issue 3
      :SYNTAX (one-obj no-obj)
      :EXAMPLE (good smells issue form the cake)
      :TYPEs
      :PAR (c-passive-moving) )))
```

The lexicon entry includes only the coarsest distinctions among word senses. Thus, the financial sense of "issue" (e.g., a new security) falls under the same core sense as the latest "issue" of a magazine. This means that for a task like database generation, task-specific processing or inference must augment the core lexical knowledge, but avoids many of the problems with considering many nuances of meaning or low-frequency senses. For example, the "progeny" sense of issue as well as the "exit" sense are omitted from the lexicon. This preserves, in the core lexicon the common coarsest distinctions among senses.

More particularly, each lexical entry has a part of speech: POS and a set of core: SENSES. Each core sense has a: TYPE field that indicates "p" for all primary senses and "s" for secondary senses. In general, a semantic interpreter utilizing the present lexicon should not consider secondary senses without specific contextual information. For example, the word "yard" can mean an enclosed area, a workplace, or a unit of measure, but only the enclosed area sense is considered in the zero-context.

The: PAR field links each word sense to its immediate parent in the semantic hierarchy. For example, with the parents and siblings of the two senses of the noun "issue", word senses are given by a root followed by a sense number, with conceptual categories designated by any atom beginning with c-. Explicit derivations are shown by roots followed by endings and additional type specifiers:

NOUN__ISSUE1:

| PARENT CHAIN: | c-concern c-mental-obj c-obj c-entity something | | |
|---|---|---|---|
| SIBLINGS: | (all nouns) | regard1 | realm2 |
| puzzle1 | province2 | premonition1 | pity1 |
| pet2 | parameter1 | ground3 | goodwill1 |
| feeling2 | enigma1 | draw2 | department2 |
| concern1 | cause2 | care1 | business3 |
| baby2 | apprehend-ion-x | | |

NOUN__ISSUE2:

| parent chain: | c-published-document | c-document | |
|---|---|---|---|
| c-phys-obj | c-obj | c-entity | something |
| SIBLINGS: | (all nouns): | week-ly-x | volume1 |
| transcript1 | tragedy2 | tome1 | thesaurus1 |
| supplement2 | strip4 | source2 | software1 |
| serial1 | scripture1 | romance2 | publication |
| profile2 | digest1 | bible1 | paperback1 |
| paper3 | paper2 | pamphlet1 | omnibus1 |
| obituary1 | novel1 | notice2 | month-ly-x |
| memoir1 | map1 | manual1 | magazine1 |
| library1 | journal1 | handbook1 | anthology1 |
| guide1 | grammar1 | gazette1 | dissertation1 |
| feature4 | facsimile1 | epic1 | encyclopedia1 |
| fiction1 | column1 | book1 | period-ic-al-x |

-continued

| directory1 | copy2 | atlas1 | dictionary1 |
|---|---|---|---|
| comic1 | column2 | blurb1 | catalogue1 |
| calendar1 | bulletin1 | brochure1 | biography1 |
| article1 | bibliography1 | constitute-ion-x1 | |

The basic semantic hierarchy acts as a sense-disambiguated thesaurus, under the assumption that in the absence of more specific knowledge, word senses will tend to share semantic constraints with the most closely related words. Note that derivative lexical entries, such as week-ly-x above, do "double duty" in the lexicon, so that an application program can use the derivation as well as the semantics of the derivative form.

The: ASSOC field includes a lexicographer's choice of synonym or closely related words for each sense.

The: SYNTAX field encodes syntactic constraints and subcategorizations for each sense. Where senses share constraints, these can be encoded at the level of the work entry. When the syntactic constraints, such as io-rec, one-obj, and no-obj, influence semantic preferences, these are attached to the sense entry. For example, in this case "issue" used as an intransitive verb would favor "passive moving" even though it is a secondary sense, while the io-rec subcategorization in the first two senses means that the ditransitive form will fill the recipient conceptual role. The grammatical knowledge base of the system relates these subcategories to semantic roles.

The: G-DERIV and: S-DERIV fields mark morphological derivations. G-DERIV (NIL in this case to indicate no derivations) encodes these derivations at the entry, or word, level, while S-DERIV encodes derivations at the sense level. Each S-DERIV derivation entry can be marked as preferred or as unpreferred. For example, the S-DERIV constraint allows "issuance" to derive from either of the first two senses of the verb, with "issuer" and "issuable" deriving only from the "giving" sense.

The derivation triples (such as (-er noun tr_actor)) encode the form of each affix, the resulting syntactic category (usually redundant), and the "semantic transformations" that apply between the core sense and the resulting senses. For example, the "issuer" in this case would play the actor role of sense one of the verb issue. Because derivations often apply to multiple senses and often result in different semantic transformations (for example, the ending -ion can indicate the act of performing some action, the object of the action, or the result of the action), the lexicon often contains strongly "preferred" interpretations to help control the ambiguity.

The lexicon may also include a substantial number of common collocations, such as verb-particle and verb-complement combinations. These expressions are often semantically productive, but the representation of common expressions helps the semantic interpreter to apply preferences. For example, the following is one set of entries for expressions with take:

```
(take
  :POS verb
  :SPECIAL
  ((take 50
    :S-COMPOUNDS
      ((vc (or (member c-verb_advise2-obj
        c-act-of-verb_blame1
```

-continued

```
        c-act-of-verb_lose1 noun_profit2)
      c-giving)))
    :EXAMPLE (take delivery)
    :PAR (c-receiving) )
  (take 51
    :S-COMPOUNDS ((vc (or (member noun_effort1)
      c-temporal-obj c-energy)))
    :EXAMPLE (the job takes up time))
    :PAR (c-require-rel) )
  (take52
    :S-COMPOUNDS ((vc (or (member noun_office2
      noun_advantage1 noun_charge1
      c-act-of-verb_control1 noun_command2
      noun_responsibility1) c-structure-rel
      c-shape-rel)))
    :PAR (c-contracting) )
  (take 59
    :S-COMPOUNDS ((vc (member noun_effect1)))
    :PAR (c-transpire) )
  (take 60
    :S-COMPOUNDS ((vc (or c-task)))
    :PAR (c-deciding) ))
```

The above entries contain only the verb-complement (vc) relations for "take". Whether these expressions are productive or not, the lexicon can include explicit word sense pairings (such as take52 with noun_pressure2), in which case the collocation helps to discriminate the senses of both verb and complement, or a pairing with a conceptual category (such as take51 with c-temporal-obj), in which case the pairing is more likely to conflict with another but will cover a much broader class of expressions (from take one's time to take years).

II. Input

Figure 1:
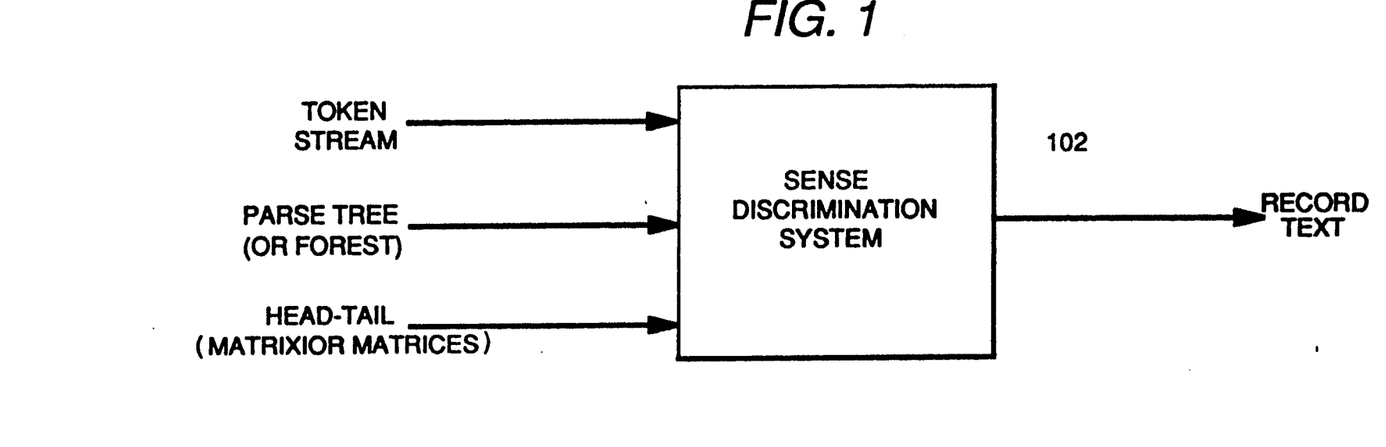
FIG. 1 is a high level block diagram illustrating input and output of the present invention.

Referring now to FIG. 1, a high level block diagram 100 of the present invention is shown. Particularly, input to a sense discrimination system 102 constructed in accordance with the present invention includes a token stream, a parse tree or forest, and a head-tail matrix or matrices. Output from the present invention, as described in Section III hereinafter, includes recoded text.

With regard to the token stream, each token is composed of one element from text to be processed. A token may be a word from the text or may be punctuation, e.g., a period or exclamation point.

In addition to a word or punctuation from the text, each sense of each lexical entry may be marked with a positive or negative morphology preference, each sense of each entry may be marked with relevant contexts and each sense of each entry may be marked with a positive or negative (frequency) status, i.e., primary and secondary senses.

More particularly, for each text element of a token the text element is associated, e.g., points to, with a lexical entry in the lexicon. For example, if the word "issue" is a text element of a token, then a pointer from the token to the lexical entry for issue could be generated. This could be performed by simply matching the text element to lexical entries.

As discussed hereinbefore, each lexical entry may have one or more senses, and a particular sense may be marked with a morphological preference retrieved from the lexicon. Further, if a particular context is ascertainable, e.g., if processing is being performed on text of articles related to the stock market, only sense which are pertinent to the particular context may be marked as the preferred senses. The marking is the identification of shared context which may be provided, for example, with regard to a classification hierarchy. In addition, and as also previously discussed, the primary/secondary meaning of the text element can also be obtained from the lexicon, and marked respectively.

Figure 2:
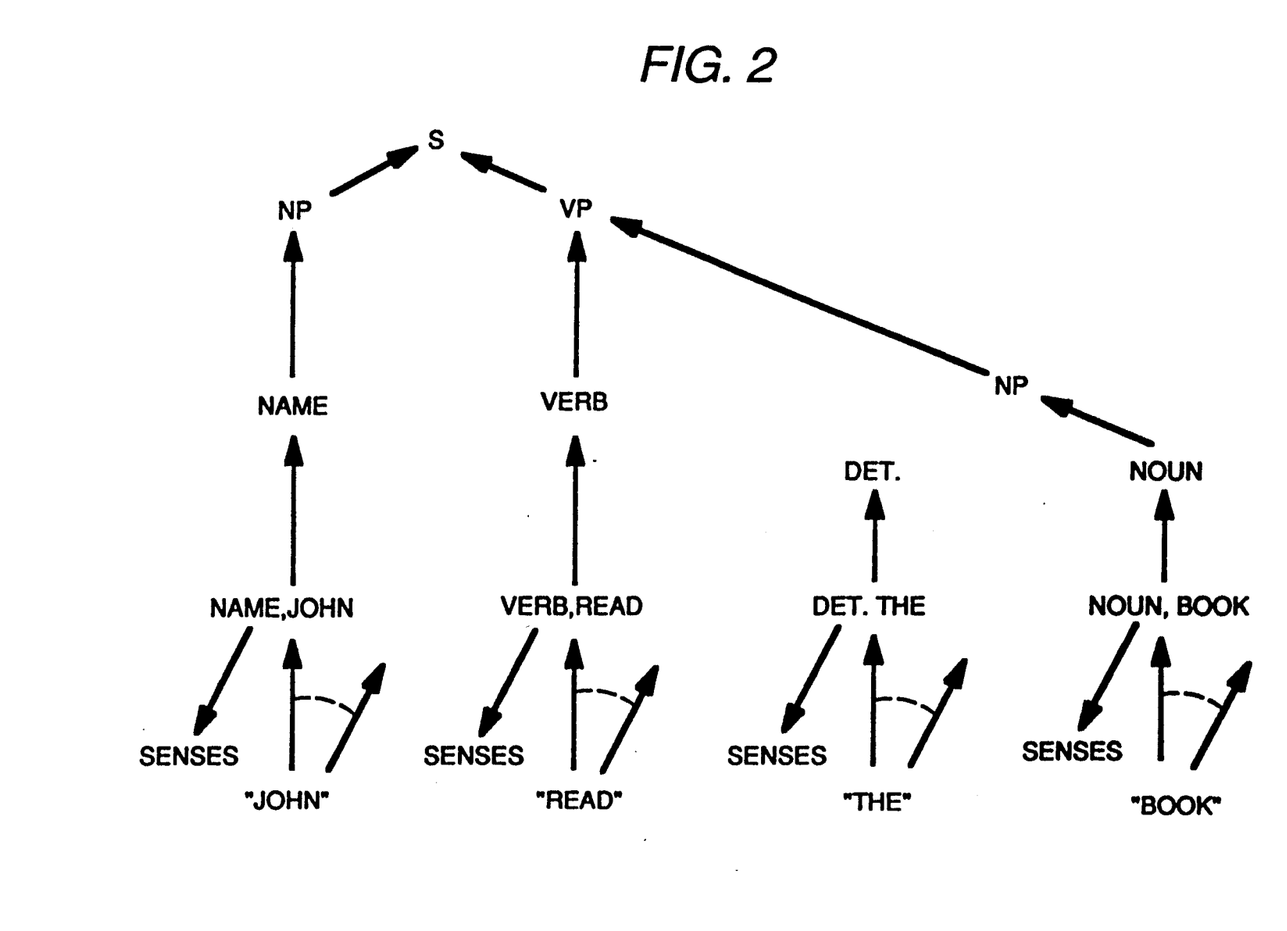
FIG. 2 illustrates a parse tree.

As also indicated in FIG. 1, further input to the present system includes a parse tree or forest. A forest is composed of a plurality of parse trees. A parse tree for the sentence "JOHN READ THE BOOK" is illustrated in FIG. 2. Each text element is a leaf node of the tree, which is shown as a "bottom-up" tree. Each leaf node points to at least one lexical entry node. For example, leaf node "JOHN" points to lexical entry NAME.-JOHN. Leaf node "JOHN" could point to a plurality of lexical entries, if such entries are provided in the lexicon. As discussed above, each lexical entry may include a plurality of senses. Each lexical entry points to a part of speech node, and each part of speech node points to a "phrase" node. These nodes may be generated using grammar rules or patterns and indicate syntactic structure. If a particular sense of a lexical entry has syntactic constraints or subcategorizations that agree with this syntactic structure, this sense is marked with a positive syntactic preference. As a last parse pass, and represented as a root node, is an entire sentence "S".

Parse trees, as known in the art, may be generated in a top-down or bottom-up fashion. The present invention is not limited to any one particular type of parse tree.

Figure 3:
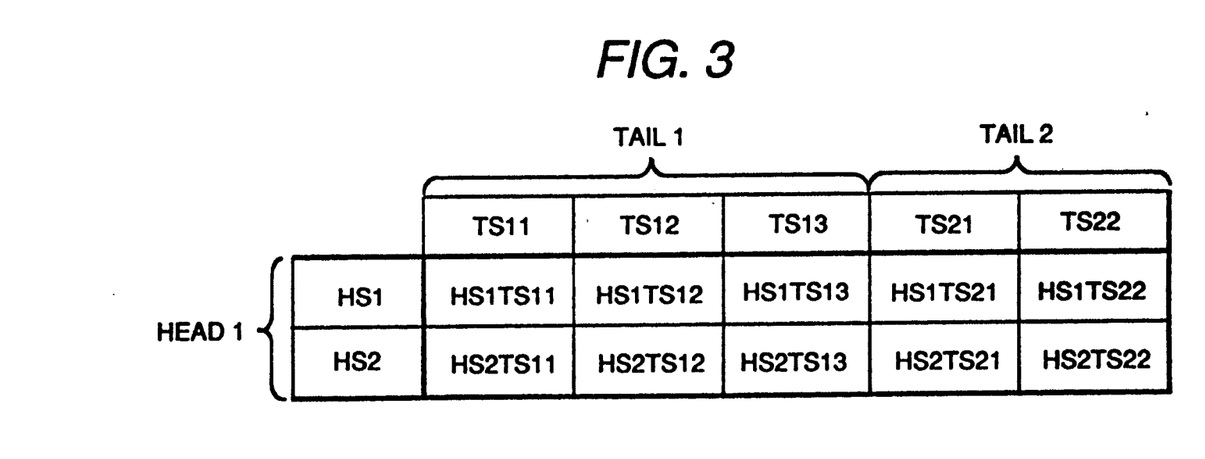
FIG. 3 illustrates a head-tail matrix.

A head-tail matrix or matrices also should be provided to the sense discrimination system as shown in FIG. 1. A head-tail matrix is illustrated in FIG. 3. In the example, there is one head element HEAD1 and two tail elements TAIL1 and TAIL2. The matrix includes rows corresponding to "head" senses HS1 and HS2 and columns corresponding to "tail" senses for TAIL1 (TS11, TS12, TS13) and TAIL2 (TS21, TS22, TS23). For any one matrix, there may be a plurality of tail elements which, as hereinafter explained, may correspond to respective text elements.

A head element and a tail element may be determined as follows. As known in the art, and referring to the parse tree in FIG. 2, a head-tail relationship exists at each "phrase" node having more than one constituent. For example, a head-tail relationship exists for the DET (determiner) and the NOUN nodes having pointers which point to a common node, i.e., a NP (noun phrase) node. A head-tail relationship also exists for the VERB and the NP nodes. These nodes point to a VP (verb phrase) node. Another NOUN node points to a NP (noun phrase) node. The NOUN node may be referred to as a head even though it is not part of a head-tail relationship. Particularly, within a phrase, one element is a head and the remaining elements are tails, known in the art as subordinates or dependents. The head element is obligatory and the tail elements are often omissible. Tails are typically modifiers or complements. Grammar rules may be used to determine which node is the head.

Then, for each head-tail relationship, a head-relation preference and a tail-relation preference are determined. The head-relation preference indicates whether the head sense prefers to have the tail sense attach to or modify it, and is marked positive or negative. The tail-relation preference indicates whether the tail sense prefers to attach to or "modify" the head sense. The tail-relation marking is a classification in a semantic hierarchy representing what the tail normally modifies. The preference markings are determined for each head tail pair and the markings are stored at the respective matrix locations for the respective head-tail pair.

It should be understood that the head-tail matrix may be built incrementally along with generation of the parse tree. For example, as the parse tree is being built, as soon as it is determined that a head-tail relationship exists, a head-tail matrix may be generated. It should also be understood that a head element of a first head-tail matrix may be a tail element of a second head-tail matrix.

The input to the present sense discrimination invention, as described above, preferably is provided in a sequence of vectors. Particularly, the data structure for the preference information for each sense of a lexical entry pointed to by a token is a vector of markings indicating:

Morphology Preference (positive or negative)-A
Conceptual Contexts (identification of shared contexts)-B
Frequency Status (positive or negative)-C
Syntatic Preference (positive or negative)-D.

The positive or negative preference may be indicated by a simple marking. Identification of shared contexts may be provided, for example, with regard to a classification hierarchy.

The data structure for the preference information of a head-tail pair is a vector of markings indicating:

Head-Relation Preference (positive or negative)-E
Tail-Relation Preference (identification of category for which the tail normally modifies)-F.

These preferences are determined as discussed above and the vectors have the form [E, F]. The tail-relation preference may be determined in accordance with a classification hierarchy.

The foregoing discussion describes the input to be provided to the present sense discrimination system. The manner in which these vectors are determined may be automated or manual. The present invention is not directed to or limited by any particular manner in which these vectors are determined. Indeed, it is contemplated that such vectors may be provided in many ways using many algorithms.

III. Output

As an example of input and output to a natural language processing system including the present sense discrimination system, an arbitrary segment of text with the resulting coding is provided below. Each word is tagged with its part of speech and sense code (a number suffix), along with a parent concept. For example, the tag [changing verb_3 (c-replacing)] shows that the input word is "changing", the preferred sense is number 3 of the verb, and that this sense falls under the concept c-replacing in the hierarchy. The present sense discrimination system is utilized to determine the preferred sense. The input text is as follows:

The network also is changing its halftime show to include viewer participation, in an attempt to hold on to its audience through half-time and into the second halves of games.

The recoded text output for the above sentence may be as follows:

[the det_1 (c-definite-qual)]
[network noun_2 (c-entertainment-obj c-business-org c-system)]
[also adv_1 (c-numeric-qual)]
[is *aux*]
[changing verb_3 (c-replacing)]

[its ppnoun—1 (c-obj)]
[halftime noun—1 (c-entity)]
[show c-act-of-verb-show1 (c-manifesting]
[to *infl*]
[include verb—2 (c-grouping)]
[viewer c-verb—view2-er (c-entity)]
[participation c-result-of-being-verb—participate1 (c-causal-state)]
[*comma* *punct*]
[in prep—27 (c-group-part)]
[an det—1 (c-definite-qual)]
[attempt c-act-or-verb—attempt1 (c-attempting)]
[to *infl*]
[hold verb—4 (c-positioning)]
[on adv—1 (c-range-qual c-continuity-qual)]
[to prep-1 (c-destination-rel)]
[its ppnoun—1 (c-obj)]
[audience noun—1 (c-human-group)]
[through prep—1 (c-course-rel)]
[halftime noun—1 (c-entity)]
[and coordconj—1 (c-conjunction)]
[into prep—5 (c-engage-in)]
[the det—1 (c-definite-qual)]
[second c-numword—two1-th (c-order-qual)]
[halves noun—1 (c-portion-part)]
[of prep-8 (c-stateobject-rel)]
[games noun—1 (c-recreation-obj)]
[*period* *punct*]

This recoded text could then be stored in a memory of a computer for later performance of tasks such as information retrieval. Again, the present invention is utilized to select the preferred sense of each input text element. For example, the present invention may be utilized to determine that the preferred sense for changing with a part of speech designated as verb, is verb—3 as designated in the lexicon.

IV. Sense Discrimination System And Method

Figure 4:
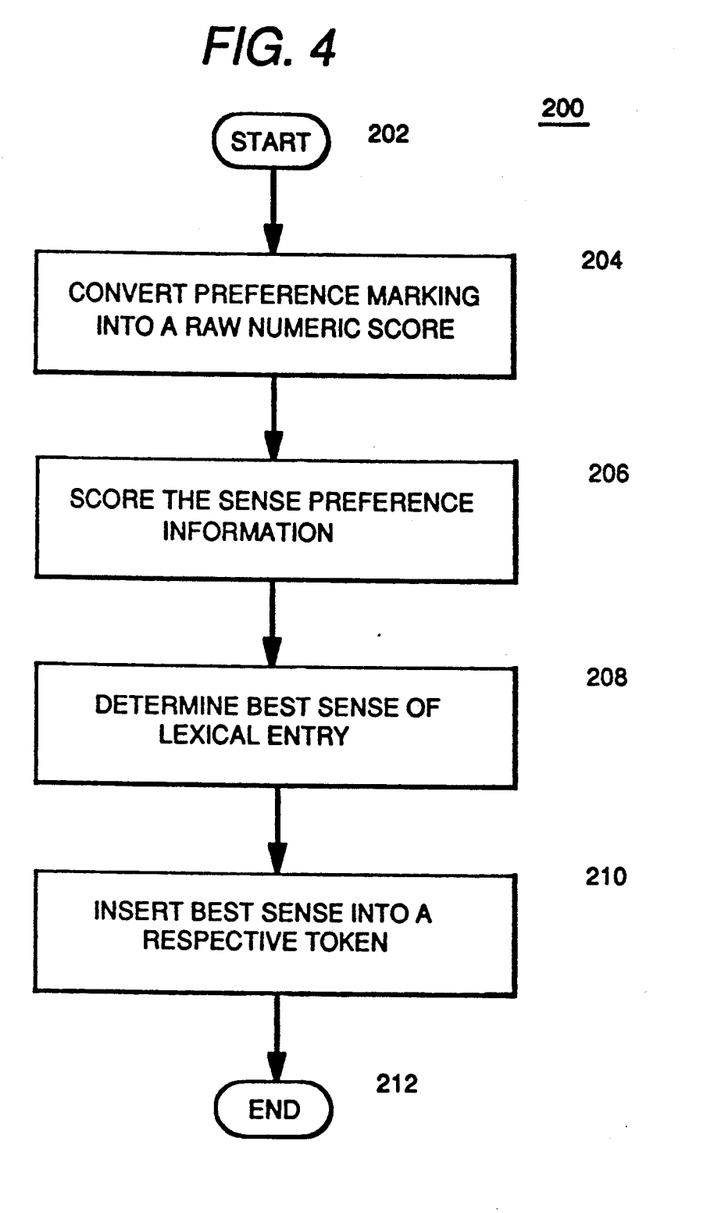
FIG. 4 shows a flow chart illustrating a sequence of method steps in accordance with the present invention.

Once the input is provided to the sense discrimination system as described above, the present invention, as illustrated in a flow chart 200 in FIG. 4 performs the following steps. Particularly, subsequent to starting operations as indicated at step 202, the present system converts a preference marking into a raw numeric score as indicated at step 204. The manner of performing this step is explained is pseudo code below:

```
To convert a preference marking into a raw numeric score
    if the type of the marking is binary
        if the preference is positive
        then
            set the raw score to 1
        else
            set the raw score to 0
    else if the raw marking is a context marking
        set the raw score to the specifity of the context
    else if the marking is a tail-relation preference
        set the raw score to the specifity of the preference
```

The sense preference vector therefore may have the form [A, B, C, D] where A is a binary 0 or 1, B is a weighted 0-10 (specifity), C is a binary 0 or 1, and D is a binary 0 or 1. As an example, if a particular sense of a lexical entry is preferred in terms of its morphology, context, frequency, and syntatic preferences, then the corresponding vector may be [1, 10, 1, 1]. The preference vectors and corresponding values may be determined by testing, grammar rules, and from heuristic knowledge of experts. For a particular head-tail preference vector wherein there is a strong head-relation preference and a strong tail-relation preference, the vector may have the form, for example, [1, 10]. Again, these preference vectors may be determined by testing, grammar rules, and from heuristic knowledge of experts.

As discussed above, the specifity of a context or preference is based on its definitional properties as set forth in the lexicon. Particularly, a degree of specificity may be determined in accordance with its relative position in a classification hierarchy. Such classification hierarchies are well known in the art.

With regard to the tail-relation preference, if the tail-relation preference marking, e.g., physical object, is an ancestor of the head sense in a classification hierarchy, then the raw score will be positive. Otherwise, the raw score is negative. Then, depending upon the degree of specifity, a numeric raw score is determined based upon the relative position of the tail-relation preference indication in the classification hierarchy.

A next step 206 in performing sense discrimination in accordance with the present invention is to score the sense preference information. The scoring step is explained below in pseudo code:

```
To score the sense preference information:
    For each preference
        Convert the preference marking into a raw score (see above)
        Multiply the score by the weight of the preference
        Sum the results
```

The "weight" referred to above indicates the importance of each preference. The importance of each preference is determined through testing and may vary according to each context. The relative weights for each preference can be determined through testing. For example, in a stock market context, one preference may be determined to be of more importance is determining a particular sense for each word than in a legal document context.

As indicated at 208, a next step is to determine the best sense of each lexical entry. The algorithm to determine the best sense for each lexical entry is described below in pseudo code:

```
To determine the preferred sense:
    For each head sense
        Score the head sense preference vector (see above)
        For each tail of the head-tail matrix
            For each tail sense
                Score the tail sense
                Score the head-tail preference vector
                The score of the head-tail matrix element is the sum
                    of the results
        Add the maximum score of each tail to the respective head
            sense score
    The maximum head sense score is the best sense
```

It should be understood that the above algorithms are to be implemented during the generation of the parse tree/head-tail matrix. In this manner, the algorithm may be utilized to incrementally determine the best sense of each text entry during the processing, and the present system need not wait until an entire parse tree/head-tail matrix has been generated to perform sense discrimination for each entry.

The best sense is then inserted into the respective token as indicated at step 210. Operations then end as indicated at step 212.

The present invention facilitates a deep-level analysis of text by providing an indication as to which sense of each word of text is preferred. The present invention directly addresses the problem encountered in prior systems by explicitly recognizing the fact that many words have multiple senses, although different words often have similar meanings. Utilizing the above scoring method, and rather than ignoring the possibility that a word may have many senses, the present invention determines a preferred sense.

The present invention also overcomes problems related to lexical inadequacy. Particularly, the present invention not only facilitates generating a deep-level understanding of text which, in turn, facilitates more accurate subsequent natural language processing, the present invention is sufficiently robust to perform any practical text processing task. This robustness is provided, for example, by facilitating use of a broad-scale lexicon which may include a plurality of senses for each lexical entry, an indication as to a context preference for each sense, and indication of primary and secondary sense preferences for each lexical entry.

A source code listing of the present sense discrimination system is provided in Appendix I. The source code is written in Lucid Common Lisp and may be run on a Sun Workstation.

While the preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

APPENDIX I

(c) Copyright 1990 General Electric Company

```
(in-package 'user)
(nl-provide 'nlt-pref-module)
;;; -*- Syntax: Common-lisp; Base: 10; Package: NLTOOLSET; Mode: LISP -*-
;;;;;;;;;;;;;;;;;;;;;;;;;;;;;;;;;;;;;;;;;;;;;;;;;;;;;;;;;;;;;;;;;;;;;;;;;;;;;
;;;                                                                       ;;;
;;;    File: score.lisp                                                   ;;;
;;;                                                                       ;;;
;;;                                                                       ;;;
;;;                                                                       ;;;
;;;    Description: Functions for storing and computing preference scores ;;;
;;;                                                                       ;;;
;;;                                                                       ;;;
;;;                                                                       ;;;
;;;                                                                       ;;;
;;;;;;;;;;;;;;;;;;;;;;;;;;;;;;;;;;;;;;;;;;;;;;;;;;;;;;;;;;;;;;;;;;;;;;;;;;;;;

(eval-when (compile)
           (nl-load "Explore/globals")
           (nl-load "Explore/structures")
           (nl-load "Explore/macros")
           (nl-load "Explore/util")
           (nl-load "Explore/know"))

;;;;;;;;;;;;;;;;;;;;;;;;;;;;;;;;;;;;;;;;;;;;;;;;;;;;;;;;;;;;;;;;;;;;;;;;;;;;;
;;;                                                                       ;;;
;;; Name:  within-score-gap                                               ;;;
;;;                                                                       ;;;
;;;                                                                       ;;;
;;;                                                                       ;;;
;;;                                                                       ;;;
;;; Args:   score1 -- a pat score                                         ;;;
;;;         score2 -- another pat score                                   ;;;
;;;                                                                       ;;;
;;; Description: Are the two scores within the score gap, i.e. too        ;;;
;;;              close to prefer one over the other                       ;;;
;;;                                                                       ;;;
;;; Returns:  t or nil                                                    ;;;
;;;                                                                       ;;;
;;;;;;;;;;;;;;;;;;;;;;;;;;;;;;;;;;;;;;;;;;;;;;;;;;;;;;;;;;;;;;;;;;;;;;;;;;;;;

(defun within-score-gap (score1 score2)
  (< (abs (- (or score1 0) (or score2 0)))
     *score-gap*))

;;maps scores returned by apply-pred into scores more indicative of
;;our view of the significance of a predicate's failure or success.
;;In particular, we may increase the negativeness of a failure.
;; Values range up to 10 and down to -infinity.
(defun score-pred (pred arg)
  (declare (ftype (function (t) t) apply-sem-pred))
  (let (score score-flag tempscore)
       (declare (ignore tempscore))
       (multiple-value-setq
         (score-flag score) (apply-sem-pred pred arg))
```

```
            (cond ((> score 10) 9)   ;;a bogus result of how preds are combined
                  ((not (minusp score)) score)
                  ((eq -1 score) -9) ;failed c-obj or c-occurrence test
                  ;;these scores are for failures of very specific preds --
                  ;;we might want to test if arg was  just too general (vs wrong).
                  ;;and make the score a little less negative
                  ((<= score -5) score) ;bad enough (possibly too neg though)
                  ;;These next two tests are intended to notice whether the
                  ;;failure occurred because a general pred was too specific
                  ;; (or the arg was not specified enough) -- ie the "near hits".
                  ;;Nonserious failures are left alone. (perhaps they should be
                  ;;made less negative) whereas serious failures are made more
                  ;;negative.
                  ((atom (if (pred-p pred) (logical-form pred) pred))
                   (setf pred (if (pred-p pred) (logical-form pred) pred))
                   (multiple-value-setq
                     (score-flag tempscore) (apply-sem-pred (cadr (isalist pred)) arg))

(if score-flag
                       score              ;;feature failure isn't too serious
                       (- (+ 10 score)))) ;;category failure is very serious (t score))
            ))

(defun score-of (label)
  (cadr (assoc label *score-table*)))

(defun syn-score-of (syn-pref)
  ;may want to weight different preferences differently
      (if (eq (cadr syn-pref) 'FAILS)
          (score-of '*syn-downscore*)
          (score-of '*syn-upscore*)))

(defun role-score-of (role-pref filler)
  (score-pred role-pref filler))

(defun base-score-of (base-pref head)
  (score-pred base-pref head))

(defun morph-score-of (morph-pref)
      (cond ((eq morph-pref 'secondary)
             (score-of '*morph-downscore*))
            ((eq morph-pref 'preferred)
             (score-of '*morph-upscore*))
            (t 0)))

(defun cl-score-of (cluster-pref)
  (declare (ftype (function (t) t) cluster-weight))
  (let ((score 0) (mult 1))
       (do ((cl cluster-pref (if (eq mult 1) (cdr cl) (remove (car cl) cl))))
           ((null cl) score)
           (setq mult (count (car cl) cl))
           (incf score (* mult
                          ;map wt to low med hi (0 1 2)
                          (round (cluster-weight (car cl)) 5))))))

(defun sense-type-score-of (pref)
     (if (eq pref 's)
         (score-of '*stype-downscore*)
         (score-of '*stype-upscore*)))

;;;;;;;;;;;;;;;;;;;;;;;;;;;;;;;;;;;;;;;;;;;;;;;;;;;;;;;;;;;;;;;;;;;;;;;;;;;;;
;;;                                                                       ;;;
;;; Name: pref-scored?, pref-score-complete, pref-rescore                 ;;;
;;;                                                                       ;;;
;;;                                                                       ;;;
;;;                                                                       ;;;
;;;                                                                       ;;;
;;; Args: obj -- any structure with an info field                         ;;;
;;;                                                                       ;;;
;;; Description: functions for testing and telling that scoring is complete ;;;
;;;              and incomplete                                           ;;;
;;;                                                                       ;;;
;;;;;;;;;;;;;;;;;;;;;;;;;;;;;;;;;;;;;;;;;;;;;;;;;;;;;;;;;;;;;;;;;;;;;;;;;;;;;
(defun pref-scored? (obj)
   (cond ((tail-p obj) (member '*done* (tail-info obj)))
         ((sense-p obj) (member '*done* (sense-info obj)))
         (t '*UNKNOWN*)))

(defun pref-score-complete (obj)
   (cond ((tail-p obj) (push '*done* (tail-info obj)))
         ((sense-p obj) (push '*done* (sense-info obj)))
         (t)))
```

```
(defun pref-rescore (obj)
  (cond ((tail-p obj) (setf (tail-info obj) (delete '*done* (tail-info obj))))
        ((sense-p obj) (setf (sense-info obj) (delete '*done* (sense-info obj))))
        (t)))
```

```
;;;;;;;;;;;;;;;;;;;;;;;;;;;;;;;;;;;;;;;;;;;;;;;;;;;;;;;;;;;;;;;;;;;;;;;;;;;;
;;;                                                                      ;;;
;;; Name: add-role-pref, add-base-pref, add-rel-pref, add-syn-pref       ;;;
;;;                                                                      ;;;
;;;                                                                      ;;;
;;;                                                                      ;;;
;;;                                                                      ;;;
;;; Args: tail -- a tail structure                                       ;;;
;;;       pref -- the preference information to be stored                ;;;
;;;                                                                      ;;;
;;; Description: functions to add preferences                            ;;;
;;;                                                                      ;;;
;;; Returns: resulting list of preferences (but changes are destructive) ;;;
;;;                                                                      ;;;
;;;;;;;;;;;;;;;;;;;;;;;;;;;;;;;;;;;;;;;;;;;;;;;;;;;;;;;;;;;;;;;;;;;;;;;;;;;;

(defun add-role-pref (tail pref)
  (if pref
      (push (list 'role pref) (tail-info tail))))

(defun add-base-pref (tail pref)
  (if pref
      (push (list 'base pref) (tail-info tail))))

(defun add-rel-pref (tail pref) ;; *holder-of* *held-by*
  (if pref
      (push (list 'rel pref) (tail-info tail))))

(defun add-syn-pref (struct pref)
  (when (and pref (not (eq pref t)))
        (cond ((tail-p struct)
               (push (cons 'syn pref) (tail-info struct)))
              ((sense-p struct)
               (push (cons 'syn pref) (sense-info struct))))))

;;;;;;;;;;;;;;;;;;;;;;;;;;;;;;;;;;;;;;;;;;;;;;;;;;;;;;;;;;;;;;;;;;;;;;;;;;;;
;;;                                                                      ;;;
;;; Name: add-phrase-pref, add-cluster-pref, add-morph-pref              ;;;
;;;       add-sense-type-pref                                            ;;;
;;;                                                                      ;;;
;;;                                                                      ;;;
;;;                                                                      ;;;
;;;                                                                      ;;;
;;; Args: sense -- a sense record                                        ;;;
;;;       pref -- (except add-cluster-pref) the type of preference       ;;;
;;;                                                                      ;;;
;;; Description: adds a list to the sense-score indicating that the      ;;;
;;;              sense's preference score should be raised for the given ;;;
;;;              reason.                                                 ;;;
;;;                                                                      ;;;
;;; Returns: the resulting sense score list                              ;;;
;;;                                                                      ;;;
;;;;;;;;;;;;;;;;;;;;;;;;;;;;;;;;;;;;;;;;;;;;;;;;;;;;;;;;;;;;;;;;;;;;;;;;;;;;

(defun add-phrase-pref (struct pref &optional (noncomp nil))
  (let ((score
         (case pref
           (cn (if noncomp '*nc-upscore* '*cn-upscore*))
           ((vc sp) (if noncomp '*nc-upscore* '*phr-upscore*))
           ((vprep nprep) '*prep-upscore*)
           (vpart '*vpart-upscore*)
           )))
    (push (list 'phrase score) (sense-info struct))
    ))

(defun add-cluster-pref (sense pref)
  (push (list 'cluster pref) (sense-info sense)))

(defun add-morph-pref (sense pref)
  (if pref
      (push (list 'morph pref) (sense-info sense))))

(defun add-sense-type-pref (sense pref)
  (if (and pref (member pref '(*primary* *secondary*)))
      (push (list 'type pref) (sense-info sense))))
```

```
;;;;;;;;;;;;;;;;;;;;;;;;;;;;;;;;;;;;;;;;;;;;;;;;;;;;;;;;;;;;;;;;;;;;;;;;;
;;;                                                                   ;;;
;;; Name: find-sense-prefs, find-tail-prefs                           ;;;
;;;                                                                   ;;;
;;;                                                                   ;;;
;;;                                                                   ;;;
;;;                                                                   ;;;
;;; Args: sense or tail -- the sense or tail structure, respectively  ;;;
;;;                                                                   ;;;
;;; Description: These find functions return all known preferences as ;;;
;;;              multiple values.  These functions need only go through ;;;
;;;              the preference lists once, saving a bit of time over ;;;
;;;              searching for each one separately.                   ;;;
;;;                                                                   ;;;
;;; Returns: the values of all of the preferences                     ;;;
;;;                                                                   ;;;
;;;;;;;;;;;;;;;;;;;;;;;;;;;;;;;;;;;;;;;;;;;;;;;;;;;;;;;;;;;;;;;;;;;;;;;;;
(defun find-sense-prefs (sense)
  (let ((phr nil) (clu nil) (frq nil) (mor nil) (synt nil))
    (dolist (p (sense-info sense))
            (when (listp p)
                  (case (car p)
                    (syn
                      (push (cdr p) synt))
                    (cluster
                      (setq clu (cadr p))
                      )
                    (type
                      (setq frq (cadr p))
                      )
                    (morph
                      (push (cadr p) mor)
                      )
                    (phrase
                      (pushnew (cadr p) phr)
                      ))))
    (values frq mor phr clu synt)))

(defun find-tail-prefs (tail)
  (let ((rol nil) (rel nil) (bas nil) (synt nil))
    (dolist (p (tail-info tail))
            (when (listp p)
                  (case (car p)
                    (role
                      (setq rol (cadr p))
                      )
                    (rel
                      (setq rel (cadr p))
                      )
                    (base
                      (setq bas (cadr p))
                      )
                    (syn
                      (push (cdr p) synt)
                      ))))
    (values rol rel bas synt)))

;;;;;;;;;;;;;;;;;;;;;;;;;;;;;;;;;;;;;;;;;;;;;;;;;;;;;;;;;;;;;;;;;;;;;;;;;
;;;                                                                   ;;;
;;; Name: find-role-pref, find-base-pref, find-rel-pref, find-syn-pref ;;;
;;;                                                                   ;;;
;;;                                                                   ;;;
;;;                                                                   ;;;
;;;                                                                   ;;;
;;;                                                                   ;;;
;;; Args: tail -- a tail structure                                    ;;;
;;;                                                                   ;;;
;;; Description: functions to find preferences                        ;;;
;;;                                                                   ;;;
;;; Returns: the preference information                               ;;;
;;;                                                                   ;;;
;;;;;;;;;;;;;;;;;;;;;;;;;;;;;;;;;;;;;;;;;;;;;;;;;;;;;;;;;;;;;;;;;;;;;;;;;
(defun find-role-pref (tail)
  (cadr (assoc 'role (tail-info tail))))

(defun find-rel-pref (tail)
  (cadr (assoc 'rel (tail-info tail))))

(defun find-base-pref (tail)
  (cadr (assoc 'base (tail-info tail))))

(defun find-syn-pref (struct)
  (let ((prefs nil))
```

```
            (dolist (p (cond ((tail-p struct) (tail-info struct))
                             ((sense-p struct) (sense-info struct))
                             (t nil)))
              (when (and (listp p) (eq (car p) 'syn))
                (push (cdr p) prefs)))
        prefs))

;;;;;;;;;;;;;;;;;;;;;;;;;;;;;;;;;;;;;;;;;;;;;;;;;;;;;;;;;;;;;;;;;;;;;;;;;;;;
;;;                                                                      ;;;
;;; Name: find-phrase-pref, find-cluster-pref, find-morph-pref           ;;;
;;;       find-sense-type-pref                                           ;;;
;;;                                                                      ;;;
;;;                                                                      ;;;
;;;                                                                      ;;;
;;;                                                                      ;;;
;;; Args: sns -- a sns structure                                         ;;;
;;;                                                                      ;;;
;;; Description: functions to find preferences in sns                    ;;;
;;;                                                                      ;;;
;;; Returns: the preference information                                  ;;;
;;;                                                                      ;;;
;;;;;;;;;;;;;;;;;;;;;;;;;;;;;;;;;;;;;;;;;;;;;;;;;;;;;;;;;;;;;;;;;;;;;;;;;;;;

(defun find-phrase-pref (sns)
  (let ((prefs nil))
    (dolist (p (sense-info sns))
      (when (and (listp p) (eq (car p) 'phrase))
        (pushnew (cadr p) prefs)))
    prefs))

(defun find-cluster-pref (sns)
  (cadr (assoc 'cluster (sense-info sns))))

(defun find-sense-type-pref (sns)
  (cadr (assoc 'type (sense-info sns))))

(defun find-morph-pref (sns)
  (let ((prefs nil))
    (dolist (p (sense-info sns))
      (when (and (listp p) (eq (car p) 'morph))
        (push (cadr p) prefs)))
    prefs))

;;;;;;;;;;;;;;;;;;;;;;;;;;;;;;;;;;;;;;;;;;;;;;;;;;;;;;;;;;;;;;;;;;;;;;;;;;;;
;;;                                                                      ;;;
;;; Name:  word-name                                                     ;;;
;;;                                                                      ;;;
;;;                                                                      ;;;
;;;                                                                      ;;;
;;;                                                                      ;;;
;;; Args: concept -- an atom corresponding to a sense name               ;;;
;;;                                                                      ;;;
;;; Description: strips off the characters describing the part of speech ;;;
;;;              (this is used to make debug statements more concise)    ;;;
;;;                                                                      ;;;
;;; Returns: an atom                                                     ;;;
;;;                                                                      ;;;
;;;;;;;;;;;;;;;;;;;;;;;;;;;;;;;;;;;;;;;;;;;;;;;;;;;;;;;;;;;;;;;;;;;;;;;;;;;;

(defun word-name (concept)
  (remove-first concept)) ;; gk redefined using utility function ;;;;;;;;;;;;;;;;;;;;;;;;;;;;;;;;;;;;;;;;;;;;;;;;;;;;;;;;;;;;;;;;;;;;;;;;;;;;
;;;                                                                      ;;;
;;; Name: call-pref-module                                               ;;;
;;;                                                                      ;;;
;;;                                                                      ;;;
;;;                                                                      ;;;
;;;                                                                      ;;;
;;; Args: apat -- a pat structure                                        ;;;
;;;                                                                      ;;;
;;; Description: Compute and set the preference score for each of the senses;;;
;;;              of the pat. (If a con has roles, make sure they have all ;;;
;;;              been scored first.)                                     ;;;
;;;                                                                      ;;;
;;; Returns:  ???                                                        ;;;
;;;                                                                      ;;;
;;;;;;;;;;;;;;;;;;;;;;;;;;;;;;;;;;;;;;;;;;;;;;;;;;;;;;;;;;;;;;;;;;;;;;;;;;;;
(defun call-pref-module (apat)
  (declare (special *processing-mode* ))
  (declare (ftype (function (t) t) scan-matrix pretty-parse
                  pretty-scored-parse score-up ))
```

```
(mdebug 'pref-module-brief
        "-%SCORING Pat -s, " (pat-name apat))

(when (member 'pref-module *debug-list*)

(nlt-format
                "-%-%SCORING Pat: -s -%" (pat-name apat) )
        (dolist (spot (pat-pat apat))
          (nlt-format
                "Cands of -s are: -(-s -)-%"
                (if (spot-p spot) (spot-type spot) spot)
                (if (spot-p spot)
                    (mapcar #'(lambda (c)
                                (when (pat-p c)
                                   (if !(pretty-scored-parse c)
                                        (terpri *nlt-output*)
                                        (list (pat-name c) (pat-score c)))))
                             (spot-cand spot))))
        )

(terpri *nlt-output*))

(cond ((null (pat-senses apat))         ;this shouldn't happen
       (nl-error :PREF :DANGER "Incoming Pat -s has no senses-%" (pat-name apat))
       (setf (pat-score apat) (- (pat-score apat) 50))
       (setf (pat-su apat) '*done*)
       )

(t
       (dolist (con (pat-senses apat))
         (unless (pref-scored? con)
           (let ((besttails nil) (rolesc 0)
                 stype-pref morph-pref cluster-pref phrase-pref syn-pref )

(multiple-value-setq
                   (stype-pref morph-pref phrase-pref cluster-pref syn-pref)
                   (find-sense-prefs con))

;;make sure each tail of the con has been scored
                ;;this scores roles individually (without using info
                ;;from other roles)

(dolist (row (sense-roles con))
                  (dolist (col row)
                    (unless (pref-scored? col)
                            (score-role col con))))

;;now do the math part, combining the best tail score with
                ;;the symbolic scores of the con.  Currently I just apply
                ;;the scoring function, but one would probably want to
                ;;introduce a weighting scheme.

;;If there is a consistent set of tails and their scores
                ;;use the sum of their role scores, else use -100
                (when (sense-roles con)
                      (multiple-value-setq (besttails rolesc)
                         (scan-matrix (sense-roles con))))

(if (and (sense-roles con)
                         (null besttails))
                    (setq rolesc -100))

;;If there is a morph preference use it, else use the
                ;;sense type pref
                (cond (morph-pref
                       (setq stype-pref 0)
                       (setq morph-pref
                             (apply #'+ (mapcar #'morph-score-of morph-pref))))
                      (stype-pref
                       (setq stype-pref (sense-type-score-of stype-pref))
                       (setq morph-pref 0))
                      (t (setf stype-pref 0 morph-pref 0)))

(setq phrase-pref
                      (apply #'+ (mapcar #'score-of phrase-pref)))

(setq cluster-pref
                      (if cluster-pref (cl-score-of cluster-pref) 0))

(setq syn-pref
                      (apply #'+ (mapcar #'syn-score-of syn-pref)))
```

```
                        ;;Now compute the total
                        (setf (sense-score con)
                              (+ stype-pref morph-pref phrase-pref cluster-pref syn-pref rol
esc))

(when (and (sense-roles con)
                                   (member 'pref-module *debug-list*))

(nlt-format " ~s~%"
                                          (mapcar
                                           #'(lambda (c)
                                               (if (tail-filler c)
                                                   (concat
                                                    (word-name (sense-name (tail-filler c)))
                                                    '/
                                                    (cadr
                                                     (isalist
                                                      (sense-name (tail-filler c)))))
                                                   "NIL FILLER"))

(car (sense-roles con))))

(nlt-format
                                  " -BEST ROLES of ~s: ~(~s~)~%"
                                  (cadr (isalist (sense-name con)))
                                  (mapcar #'(lambda (tail)
                                              (list (tail-role tail)
                                                    (tail-score tail)))
                                          besttails))

)

(mdebug 'pref-module
                                "***SNS_SC ~s: Type ~d Morph ~d Phr ~d Cl ~d Syn ~d Role ~d T
OTAL ~d~%"

(sense-name con)
                                stype-pref
                                morph-pref phrase-pref cluster-pref syn-pref rolesc
                                (sense-score con))

(pref-score-complete con))))

(when (and (notany #'sense-roles (pat-senses apat))
                   (member 'pref-module *debug-list*))
          (nlt-format " ~s~%"
                      (mapcar #'(lambda (c)
                                  (concat
                                   (word-name (sense-name c))
                                   '/
                                   (cadr
                                    (isalist
                                     (sense-name c)))))

(pat-senses apat))))

;;FILTER OUT THE BAD SENSES
        (cond ((and (pat-senses apat)
                    (eq *processing-mode* '*aggressive*))
               ;;1. sort the senses by increasing score, deleting bad ones
               (let ((conlist
                      (member-if
                       #'(lambda (x)
                           (> (sense-score x) *sense-score-threshold*))
                       (sort (pat-senses apat)
                             #'(lambda (x y)
                                 (< (sense-score x) (sense-score y)))))))

;;2. pick off all the low scoring cons
                 (do ((c conlist (cdr c)))
                     ((null (cdr c))
                      (setf (pat-senses apat) (reverse conlist)))
                   (when
                       (< (sense-score (car c))
                          (- (sense-score (cadr c)) *score-gap*))
                     (nl-error :PREF :WARN
                               "Sense ~s deleted because score too low~%"
                               (sense-name (car c)))
                     (setq conlist (cdr c)))))
```

```
            ))
          ((pat-senses apat)
           (setf (pat-senses apat)
             (delete-if #'(lambda (con)
                           (cond ((< (sense-score con) *sense-score-threshold*)
                                  (nl-error :PREF :WARN
                                    "Sense -s deleted because score < thresho
ld -s-%"
                                    (sense-name con)
                                    *sense-score-threshold*)
                                  t)))
                        (pat-senses apat)))))

(cond ((null (pat-senses apat))
              (nl-error :PREF :WARN "Outgoing Pat -s has no senses-%"
                        (pat-name apat))
              (setf (pat-score apat) (- (pat-score apat) 50))
              (setf (pat-su apat) '*done*)
              )
             (t
              ;;SCORE THE PAT
              (score-up apat)
              ))))

(mdebug 'pref-module "FINAL SCORE of Pat -s is -s-%"
           (pat-name apat) (pat-score apat))

(when (member 'pref-module-brief *debug-list*)
     (let ((besttails nil) (rolesc nil))
       (declare (ignore rolesc))
       (nlt-format
        "FINAL SCORE of Pat is -s-%"
        (pat-score apat))
       (dolist (con (pat-senses apat))
         (multiple-value-setq (besttails rolesc)
           (scan-matrix (sense-roles con)))

(nlt-format
          "  -s (-s) SCORE: -s-%"
          (sense-name con)
          (cadr (isalist (sense-name con)))
          (sense-score con))

(if besttails
             (nlt-format
              "    ROLES: -{-s-}-%"
              (mapcar #'(lambda (tail)
                          (list (tail-role tail)
                                (tail-score tail)))
                      besttails))))))
 )

;;;;;;;;;;;;;;;;;;;;;;;;;;;;;;;;;;;;;;;;;;;;;;;;;;;;;;;;;;;;;;;;;;;;;;;;;;;;;;
;;;                                                                         ;;;
;;; Name: score-role                                                        ;;;
;;;                                                                         ;;;
;;;                                                                         ;;;
;;;                                                                         ;;;
;;;                                                                         ;;;
;;; Args: tail -- the tail to score                                         ;;;
;;;                                                                         ;;;
;;; Description:                                                            ;;;
;;;                                                                         ;;;
;;; Returns:                                                                ;;;
;;;                                                                         ;;;
;;;;;;;;;;;;;;;;;;;;;;;;;;;;;;;;;;;;;;;;;;;;;;;;;;;;;;;;;;;;;;;;;;;;;;;;;;;;;;;
(defun score-role (tail head)
  (cond ((null (tail-filler tail))
         (setf (tail-score tail) -40)
         (mdebug 'pref-module
           " FINAL SCORE of Tail is -s, Filler for -s of -s is NIL-%"
           (tail-score tail) (tail-role tail) (sense-name head)))
        (t
         (let ((sns-pref 0) role-pref base-pref rel-pref syn-pref)

(multiple-value-setq (role-pref rel-pref base-pref syn-pref)
                                (find-tail-prefs tail))

;;do the math, combining the score of the tail as a sense
```

```
;;with various roles scores such as specificity scores
;; (pref-function)

;;Types of scores for tails:
;; 1. underlying sense score (origin or filler)
;; 2. role score (predicate: how well filler fills role)
;; 3. base score (predicate: how well role likes frame)
;; 4. rel score (*holder-of* or *held-by*, if frame takes role)
;; 5. syntactic score (<constraint> <polarity>)

;;get the sense score from the correct parent
(cond ((tail-origin tail)
       (setq sns-pref
             (- (sense-score (tail-origin tail))
                (- (apply #'max  ;;max-role-score
                         (mapcar #'tail-score
                                 (car (sense-roles
                                       (tail-origin tail)))))

(tail-score ;;role-score of filler
                    (find-if
                     #'(lambda (rol)
                         (eq (tail-filler tail)
                             (tail-filler rol)))
                     (car (sense-roles (tail-origin tail)))))))))
      )
      (t
       (setq sns-pref (sense-score (tail-filler tail)))))

;;get the rest of the scores by converting symbolic preferences
(setq role-pref
      (if role-pref (role-score-of role-pref (tail-filler tail))
          0))

(cond ((and (null base-pref)
            (null rel-pref))
       ;frame and role don't know each other --
       ;we take this as a bad sign
       (setq base-pref 0)
       (setq rel-pref -4))
      (t
       (setq base-pref
             (if base-pref (base-score-of base-pref head) 0))

(setq rel-pref (if rel-pref (score-of rel-pref) 0))))

;;syn-wt is dynamic: only negative syntax scores are important
(setq syn-pref (apply #'+ (mapcar #'syn-score-of syn-pref)))

;;Now compute the total
(setf (tail-score tail)
      (+ sns-pref role-pref base-pref rel-pref syn-pref))

(mdebug
 'pref-module
 " TAIL_SC -a -s -(-a-): Sns -d Rol -d Bas -d Rel -d Syn -d TOTAL -d-%"
 (subseq (string (tail-role tail))
         0
         (min (length (string (tail-role tail))) 8))
 (word-name (sense-name (tail-filler tail)))
 (if (tail-origin tail)

(list "ORIG:" (word-name (sense-name (tail-origin tail))))))
         sns-pref role-pref base-pref rel-pref syn-pref (tail-score tail)))))

(pref-score-complete tail)

)

(defun sense-prefs (con)
  ;;converts sense-info and role info into assoc list for
  (declare (ftype (function (t) t) scan-matrix))
  (let (stype-pref morph-pref cluster-pref phrase-pref syn-pref
        mval cval pval sval fval rval
        besttails result)
```

```
     (multiple-value-setq
      (stype-pref morph-pref phrase-pref cluster-pref syn-pref)
      (find-sense-prefs con))

(when (sense-roles con)
           (multiple-value-setq (besttails rval)
                                (scan-matrix (sense-roles con))))

(if (and (sense-roles con) (null besttails))
         (setq rval -100))

;;If there is a morph preference use it, else use the
     ;;sense type pref (cond (morph-pref
            (setq fval 0)
            (setq mval (apply #'+ (mapcar #'morph-score-of morph-pref))))
           (stype-pref
            (setq fval (sense-type-score-of stype-pref))
            (setq mval 0))
           (t (setf fval 0 mval 0)))

(setq pval (apply #'+ (mapcar #'score-of phrase-pref)))
     (setq cval (if cluster-pref (cl-score-of cluster-pref) 0))
     (setq sval (apply #'+ (mapcar #'syn-score-of syn-pref)))
     (setq result
           (list
            (list 'Fr fval)
            (list 'Mo mval)
            (list 'Cl cval)
            (list 'Ph pval)
            (list 'Sy sval)))
     (if besttails
         (setq result
               (append result
                       (list (mapcar
                              #'(lambda (rol) (tail-prefs rol con))
                                           besttails) 'TOTAL rval))))

result))

(defun tail-prefs (tail head)
  (cond ((null (tail-filler tail))
         nil)
        (t
         (let ((sns-val 0)
               role-pref base-pref rel-pref syn-pref
               roval bval rlval sval)

(multiple-value-setq (role-pref rel-pref base-pref syn-pref)
                     (find-tail-prefs tail))

;;get the sense score from the correct parent
(cond ((tail-origin tail)
       (setq sns-val
             (- (sense-score (tail-origin tail))
                (- (apply #'max  ;;max-role-score
                          (mapcar #'tail-score
                                  (car (sense-roles
                                        (tail-origin tail)))))

(tail-score  ;;role-score of filler
                    (find-if
                     #'(lambda (rol)
                         (eq (tail-filler tail)
                             (tail-filler rol)))
                     (car (sense-roles (tail-origin tail)))))))))
      )
      (t
       (setq sns-val (sense-score (tail-filler tail)))))

;;get the rest of the scores by converting symbolic preferences
(setq roval
      (if role-pref (role-score-of role-pref (tail-filler tail))
          0))

(cond ((and (null base-pref)
            (null rel-pref))
       ;frame and role don't know each other —
       ;we take this as a bad sign
       (setq bval 0)
       (setq rlval -4))
```

```
(t
    (setq bval
            (if base-pref (base-score-of base-pref head) 0))

(setq rlval (if rel-pref (score-of rel-pref) 0))))

;;syn-wt is dynamic: only negative syntax scores are important
(setq sval (apply #'+ (mapcar #'syn-score-of syn-pref)))

(list (tail-role tail)
      (list 'Sns sns-val)
      (list 'Rol roval)
      (list 'Rel rlval)
      (list 'Bas bval)
      (list 'Syn sval)))))
```

What is claimed is:

1. A method for word sense discrimination in a natural language processing system including an input text and a lexicon containing lexical entries for words, said lexicon having associated with each sense of a lexical entry a vector of preference markings, said method comprising the steps of:

reading said input text and for each word read:

converting each preference marking into a raw numeric score;

scoring each sense for said word in said lexical entry using said raw numeric score; and determining a best sense for said word from said scoring step.

2. The method of claim 1 wherein said preference markings indicate for words read from said input text, morphology preference, conceptual contexts, frequency, syntactic preference, head-relation preference, and tail-relation preference.

3. The method of claim 1 wherein said scoring step comprises the steps of:

(a) multiplying said raw numeric scores by a weight for each sense, said weight having been stored with each lexical entry; and (b) summing the result from step (a) for each sense.

* * * * *